(12) United States Patent
Ye et al.

(10) Patent No.: US 8,121,418 B2
(45) Date of Patent: *Feb. 21, 2012

(54) METHODS AND SYSTEMS FOR SIGNIFICANCE COEFFICIENT CODING IN VIDEO COMPRESSION

(75) Inventors: Yan Ye, San Diego, CA (US); Yiliang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/840,229

(22) Filed: Jul. 20, 2010

(65) Prior Publication Data

US 2010/0284462 A1   Nov. 11, 2010

Related U.S. Application Data

(63) Continuation of application No. 11/469,606, filed on Sep. 1, 2006, now Pat. No. 7,778,472.

(60) Provisional application No. 60/786,798, filed on Mar. 27, 2006.

(51) Int. Cl.
*G06K 9/36* (2006.01)

(52) U.S. Cl. ........................................... 382/232

(58) Field of Classification Search .......... 382/232–233, 382/236, 238–251; 348/394.1, 395.1, 408.1–420.1; 375/240.02, 240.12–240.2, 240.23–240.24
See application file for complete search history.

(56) References Cited

U.S. PATENT DOCUMENTS

| | | | |
|---|---|---|---|
| 5,150,209 A | 9/1992 | Baker et al. | |
| 6,069,575 A | 5/2000 | Kinouchi et al. | |
| 6,072,830 A | 6/2000 | Proctor et al. | |
| 6,571,016 B1 | 5/2003 | Mehrotra et al. | |
| 6,807,231 B1 | 10/2004 | Wiegand et al. | |
| 7,162,091 B2 | 1/2007 | Wang et al. | |
| 7,483,581 B2 | 1/2009 | Raveendran et al. | |
| 7,778,472 B2 * | 8/2010 | Ye et al. | 382/232 |
| 2004/0146208 A1 | 7/2004 | Pazmino et al. | |

FOREIGN PATENT DOCUMENTS

| | | |
|---|---|---|
| CN | 1589023 | 3/2005 |
| EP | 0749111 | 12/1996 |
| EP | 1487113 | 12/2004 |

(Continued)

OTHER PUBLICATIONS

Apostolopoulos, J., et al.: "Position-dependent encoding," Proceedings of the International Conference on Acoustics, Speech and Signal Processing, Apr. 19-22, 1994, New York, IEEE, US, vol. vol. 5 Conf. 19, Apr. 19, 1994, pp. V-573-V-576, ISBN: 0-7803-1776-9, XP000533778.

(Continued)

*Primary Examiner* — Jose Couso
(74) *Attorney, Agent, or Firm* — John Rickenbrode

(57) ABSTRACT

A method for decoding significance coefficients in an encoded video sequence is described. An encoded video bitstream is received. Codebook table information is retrieved from the bitstream. Significance symbols are decoded using the retrieved codebook table information. Significance coefficients are decoded using the significance symbols. A plurality of transform coefficients is dequantized. An inverse transform is applied to a residual signal. A video sequence is constructed. A method for coding significance coefficients in a video sequence is also described.

32 Claims, 12 Drawing Sheets

FOREIGN PATENT DOCUMENTS

| | | |
|---|---|---|
| RU | 2313174 | 12/2007 |
| SU | 2128405 | 3/1999 |
| SU | 2189120 | 9/2002 |
| WO | WO03084076 A1 | 10/2003 |
| WO | WO2005027521 A1 | 3/2005 |

OTHER PUBLICATIONS

International Search Report—PCT/US07/064914, International Search Authority—European Patent Office— Nov. 2, 2007.

Jeon, B., et al.: "Huffman coding of DCT coefficients using dynamic codeword assignment and adaptive codebook selection" Signal Processing: Image Communication, vol. 12, No. 3, Jun. 1998, pp. 253-262, ISSN: 0923-5965, XP004122852.

Lakhani, G. et al.: "Optimal Huffman coding of DCT blocks," IEEE transactions on circuits and systems for video technology, vol. 14, No. 4, Apr. 2004, pp. 522- 527, ISSN: 1051-8215, XP011110022.

Ridge, J., et al., "Variable Length Codes for SVC," Joint Video Team (JVT) of ISO/IEC MPEG & ITU-T VCEG (ISO/IEC JTC1/SC29/WG11 and ITU-T SG16 Q.6), 16th Meeting: Poznan, Poland, Jul. 24-29, 2005, No. JVT-P056, Jul. 24, 2005, XP0301006095, pp. 1-7.

Taiwanese Search report—096110574—TIPO—Aug. 16, 2010 (060945).

Wiegand, T. et al.: "Joint draft 5: Scalable video coding (in integrated form with ITU-T Rec. H.264 ISO/IEC 14996-10), Annex F: scalable video coding" ISO/IEC.

JTC1/SC29/WG11 & ITU-T SG 16 JVT, Online No. JVT-R201, Jan. 2006, pp. 349-504, XP002448230.

Written Opinion—PCT/US07/064914, International Search Authority—European Patent Office—Nov. 2, 2007.

\* cited by examiner

FIG. 6

| symbol | Code length | Code word (m=0) |
|---|---|---|
| 0 | 1 | 0 |
| 1 | 3 | 100 |
| 2 | 3 | 101 |
| 3 | 3 | 110 |
| 4 | 5 | 11100 |
| 5 | 5 | 11101 |
| 6 | 5 | 11110 |
| ... | ... | ... |

```
// encoding of unary code
let S = input symbol
let C = 0
do
{
   if(S == C)
   {
      write bit "0"
      break
   }
   else
   {
      write bit "1"
      increment C
   }
} while (true)
```

```
// decoding of unary code
initialize S to 0
do
{
   let B = read one bit
   if(B == "0")
   {
      break
   }
   else
   {
      increment S
   }
}
while (true)
return the decoded symbol S
```

Codebook 0 (the unary code)

FIG. 8

Codebook 1

Codebook 2

← 1102

| Codebook | Code length | Code word |
|----------|-------------|-----------|
| 0 | 1 | 1 |
| 1 | 2 | 01 |
| 2 | 3 | 001 |
| 3 | 4 | 0001 |
| 4 | 4 | 0000 |

VLC code table used to code the codebook table entries

FIG. 11

| 0 | 3 | 0 | 3 | 3 | 0 | 0 | 0 | 0 | 2 | 0 | 0 | 3 | 0 | 0 |
|---|---|---|---|---|---|---|---|---|---|---|---|---|---|---|
| 3 | 1 | 2 | 2 | 1 | 2 | 2 | 1 | 1 | 1 | 2 | 1 | 1 | 0 | 0 | 0 |
| 1 | 0 | 1 | 1 | 2 | 3 | 0 | 2 | 1 | 1 | 2 | 1 | 0 | 0 | 0 | 0 |
| 2 | 3 | 1 | 0 | 1 | 1 | 1 | 0 | 1 | 2 | 2 | 2 | 3 | 0 | 0 | 0 |
| 0 | 2 | 0 | 1 | 0 | 2 | 3 | 2 | 0 | 4 | 4 | 2 | 0 | 0 | 0 | 0 |
| 1 | 1 | 0 | 1 | 1 | 3 | 0 | 2 | 4 | 4 | 2 | 2 | 3 | 0 | 0 | 0 |
| 2 | 2 | 1 | 2 | 3 | 4 | 0 | 1 | 2 | 0 | 1 | 1 | 1 | 0 | 0 | 0 |
| 1 | 0 | 1 | 0 | 1 | 2 | 4 | 2 | 1 | 3 | 3 | 2 | 0 | 0 | 0 |
| 0 | 0 | 3 | 0 | 0 | 2 | 0 | 0 | 0 | 3 | 2 | 1 | 0 | 0 | 0 | 0 |
| 0 | 0 | 0 | 3 | 0 | 2 | 0 | 0 | 0 | 0 | 3 | 0 | 0 | 0 | 0 |
| 3 | 0 | 3 | 0 | 0 | 1 | 0 | 0 | 0 | 0 | 0 | 0 | 0 | 0 | 0 |
| 0 | 3 | 3 | 0 | 0 | 0 | 0 | 0 | 0 | 0 | 0 | 0 | 0 | 0 | 0 |
| 0 | 0 | 2 | 0 | 2 | 0 | 0 | 0 | 0 | 0 | 0 | 0 | 0 | 0 | 0 |
| 0 | 0 | 2 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

Rectangle table:
Width = 13
Height= 12

Rectangle-shaped codebook selection table

| 0 | 3 | 0 | 3 | 3 | 0 | 0 | 0 | 0 | 0 | 2 | 0 | 0 | 3 | 0 | 0 |
|---|---|---|---|---|---|---|---|---|---|---|---|---|---|---|---|
| 3 | 1 | 2 | 2 | 1 | 2 | 2 | 1 | 1 | 1 | 2 | 1 | 1 | 0 | 0 | 0 |
| 1 | 0 | 1 | 1 | 2 | 3 | 0 | 2 | 1 | 1 | 2 | 1 | 0 | 0 | 0 | 0 |
| 2 | 3 | 1 | 0 | 1 | 1 | 1 | 0 | 1 | 2 | 2 | 2 | 3 | 0 | 0 | 0 |
| 0 | 2 | 0 | 1 | 0 | 2 | 3 | 2 | 0 | 4 | 4 | 2 | 0 | 0 | 0 | 0 |
| 1 | 1 | 0 | 1 | 1 | 3 | 0 | 2 | 4 | 4 | 2 | 2 | 3 | 0 | 0 | 0 |
| 2 | 2 | 1 | 2 | 3 | 4 | 0 | 1 | 2 | 0 | 1 | 1 | 1 | 0 | 0 | 0 |
| 1 | 0 | 1 | 0 | 1 | 2 | 0 | 4 | 2 | 1 | 3 | 3 | 2 | 0 | 0 | 0 |
| 0 | 0 | 3 | 0 | 0 | 2 | 0 | 0 | 0 | 3 | 2 | 1 | 0 | 0 | 0 | 0 |
| 0 | 0 | 0 | 3 | 0 | 2 | 0 | 0 | 0 | 0 | 3 | 0 | 0 | 0 | 0 | 0 |
| 3 | 0 | 3 | 0 | 0 | 1 | 0 | 0 | 0 | 0 | 0 | 0 | 0 | 0 | 0 | 0 |
| 0 | 3 | 3 | 0 | 0 | 0 | 0 | 0 | 0 | 0 | 0 | 0 | 0 | 0 | 0 | 0 |
| 0 | 0 | 2 | 0 | 2 | 0 | 0 | 0 | 0 | 0 | 0 | 0 | 0 | 0 | 0 | 0 |
| 0 | 0 | 2 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Triangle table
Width = 13
Height = 12
Depth = 4

Triangle-shaped codebook selection table

FIG. 13

```
let TS = shape of pruned table
if( TS == "rectangle")
{
  send bit "0"
  if (table size is zero)
    send bit "0"
  else
  {
    send bit "1"
    send (width-1)  in 4 bits
    send (height-1) in 4 bits
  }
}
else // triangle table
{
  send bit "1"
  send (width-1)  in 4 bits
  send (height-1) in 4 bits
  send (depth-1) in 4 bits
}
 code table entries inside the pruned table
```

Coding the pruned codebook selection table

FIG. 14 ical Field

The present systems and methods relate generally to video processing. More specifically, the present systems and methods relate to encoding and decoding information relating to video compression techniques.

BACKGROUND

Video compression refers to compression of digital video data. Video compression is used for efficient coding of video data in video file formats and streaming and broadcasting video formats. Compression is a conversion of data to a format that has fewer bits, which may be stored or transmitted more efficiently. The inverse of compression is decompression, which produces a replica (or a close approximation) of the original data.

Today, some video compression methods apply a certain type of discrete transform such as Discrete Cosine Transform (DCT) for reducing remaining spatial redundancy in a prediction residual, which is generated using either temporal or spatial prediction techniques. Some video compression techniques also involve quantization. Quantization can either be scalar quantization or vector quantization. After quantization, quantized coefficients may be entropy coded and placed into a compressed video bit stream. The compressed bit stream is then sent to a decoder, which will decompress the bit stream and recover a close approximation of the original video data.

Video compression techniques may benefit consumers of various forms of media. For example, in broadcast engineering, digital television may be made practical by video compression. Television (TV) stations can broadcast High-Definition television (HDTV) and multiple virtual channels on the same physical channel. Digital video broadcasts may use the Moving Picture Experts Group (MPEG) standard, such as the MPEG-2 standard video compression format. However, H.264/MPEG-4 and VC-1 are beginning to emerge as new standards in video compression.

Unfortunately, known systems and methods for coding information in video compression may suffer from various drawbacks. Accordingly, benefits may be realized by improved systems and methods for coding information in video compression.

BRIEF DESCRIPTION OF THE DRAWINGS

FIG. 6 illustrates one configuration of classifying significant and refinement coefficients;

FIG. 7 illustrates one configuration of a table of code words and code lengths;

FIG. 8 illustrates pseudo code for encoding and decoding for codebook 0 (the unary code);

FIG. 11 illustrates one configuration of a variable length coding (VLC) table used to code the codebook selection table entries;

FIG. 12 is one configuration of a rectangle-shaped codebook selection table;

FIG. 13 is one configuration of a triangle-shaped codebook selection table;

FIG. 14 illustrates pseudo code for coding a pruned codebook selection table.

DETAILED DESCRIPTION

Figure 1:
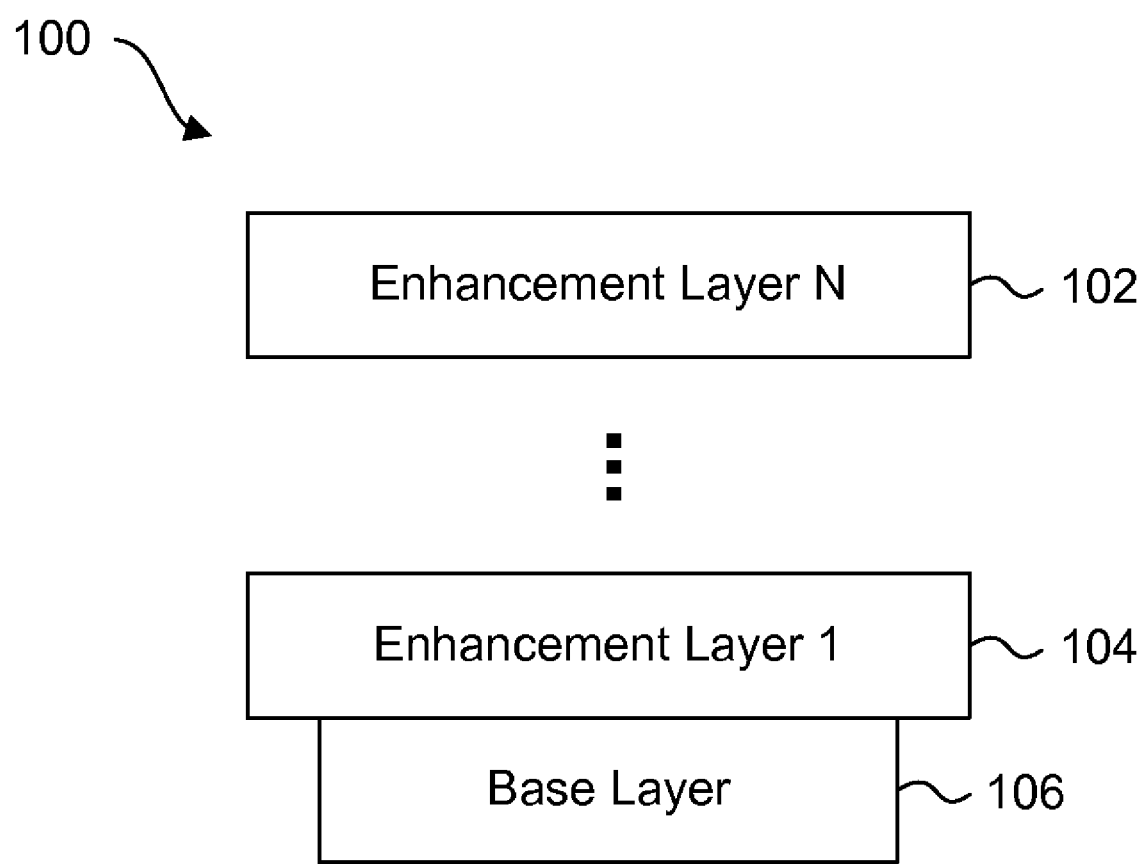
FIG. 1 is a block diagram illustrating one configuration of a scalable video coding bitstream.

A method for coding significance coefficients in a video sequence is described. A video sequence is received. A prediction of an original video signal in a current frame is constructed from the video sequence. A residual signal is formed by subtracting the prediction of the original video signal from the original video signal in the current frame. A transform is applied to the residual signal. A plurality of transform coefficients is quantized. A codebook is selected from a plurality of codebooks to code at least one of a significance run and an end-of-block. The at least one of a significance run and end-of-block are coded using the selected codebook.

An electronic device is also disclosed. The electronic device includes a processor and memory in electronic communication with the processor. Instructions are stored in the memory. A video sequence is received. A prediction of an original video signal in a current frame is constructed from the video sequence. A residual signal is formed by subtracting the prediction of the original video signal from the original video signal in the current frame. A transform is applied to the residual signal. A plurality of transform coefficients is quantized. A codebook is selected from a plurality of codebooks to code at least one of a significance run and an end-of-block. The at least one of a significance run and end-of-block are coded using the selected codebook.

A method for decoding significance coefficients in an encoded video sequence is described. An encoded video bitstream is received. Codebook table information is retrieved from the bitstream. Significance symbols are decoded using the retrieved codebook table information. Significance coefficients are decoded using the significance symbols. A plurality of transform coefficients is dequantized. An inverse transform is applied to a residual signal. A video sequence is constructed.

An end-of-block may be coded using the selected codebook. The codebook table information may be coded within a video slice. The codebook table information may include a codebook selection table. The codebook selection table may include each entry corresponding to each pair of coding cycle numbers and a LEBL (last encoded coefficient in the base layer) position. In one configuration, the codebook selection table includes each entry corresponding to only the coding cycle number. The codebook selection table may be coded as a one-dimensional array of codebook selectors. The codebook selectors are coded using a variable length code.

The codebook table information may include a table shape and a table dimension. In one aspect, the table shape is rectangular. In an additional aspect, the table shape is triangular.

The codebook selection table may be dynamically determined from a statistics estimation. In one configuration, the codebook selection table may be dynamically determined from a neighboring correlation. The codebook may be a shifted version of another codebook.

A codebook selection table may be pruned to provide a pruned codebook selection table. The pruned codebook selection table may be coded with a video slice.

An electronic device is also disclosed. The electronic device includes a processor and memory in electronic communication with the processor. Instructions are stored in the memory. An encoded video bitstream is received. Codebook table information is retrieved from the bitstream. Significance symbols are decoded using the retrieved codebook table information. Significance coefficients are decoded using the significance symbols. A plurality of transform coefficients is dequantized. An inverse transform is applied to a residual signal. A video sequence is constructed.

In one configuration, the codebook table information may be decoded from a slice. The codebook table information may include a codebook selection table. The codebook table information may include a codebook selection table mapping cycle number and a LEBL (last encoded coefficient in the base layer) position. The codebook table information may include a codebook selection table mapping cycle number.

The codebook table information may include a table shape and a table dimension. In one configuration, the table shape may be rectangular. In an additional configuration, the table shape is triangular.

The codebook selection table may be dynamically determined from a statistics estimation. The codebook selection table may be dynamically determined from a neighboring correlation.

An electronic device that is configured to code significance coefficients in a video sequence is also disclosed. The electronic device includes a means for processing and a means for receiving a video sequence. A means for constructing a prediction of an original video sequence in a current frame from the video sequence and a means for forming a residual frame by subtracting the prediction of the original video signal from the original video signal in the current frame are disclosed. A means for applying a transform to the residual signal and a means for quantizing a plurality of transform coefficients are disclosed. A means for selecting a codebook from a plurality of codebooks to code at least one of a significance run and end-of-block and a means for coding the at least one of a significance run and end-of-block using the selected codebook are disclosed.

Various configurations of the systems and methods are now described with reference to the Figures, where like reference numbers indicate identical or functionally similar elements. The features of the present systems and methods, as generally described and illustrated in the Figures herein, could be arranged and designed in a wide variety of different configurations. Thus, the detailed description below is not intended to limit the scope of the systems and methods, as claimed, but is merely representative of the configurations of the systems and methods.

Many features of the configurations disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

Where the described functionality is implemented as computer software, such software may include any type of computer instruction or computer/machine executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "a configuration," "configuration," "configurations," "the configuration," "the configurations," "one or more configurations," "some configurations," "certain configurations," "one configuration," "another configuration" and the like mean "one or more (but not necessarily all) configurations of the disclosed systems and methods," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

Some steps performed in current video compression systems are known. After some video compression steps, such as prediction, transform, and quantization, a next step is to perform entropy coding on syntax elements and quantized coefficients to form a bitstream. In a video decoder, an inverse process is performed. Syntax elements and the quantized coefficients are decoded from the bitstream. Then the inverse quantization and inverse transform steps are performed. Finally, the reconstructed residual is added to the prediction to reconstruct the video signal.

Currently, a Joint Video Team (JVT), which consists of video coding experts from ISO/IEC MPEG and ITU-T VCEG, is working on a Scalable Video Coding (SVC) extension to H.264/Advanced Video Coding (AVC). The common software, called Joint Scalable Video Model (JSVM), is being used by the participants. JSVM may support various scalability features. An SVC bitstream can have fine-granularity scalability, spatial scalability, temporal scalability, or any combination of the three.

Fine granularity scalability, hereafter referred to as FGS, is an important and highly desired feature for video coding. This feature allows the compressed video bitstream to be almost arbitrarily truncated, while at the same time providing the end user with graceful degradation of the decoded video quality.

In fine granularity scalability, an enhancement layer bitstream can be arbitrarily truncated. As the video decoder receives and decodes more bits in this layer, it will produce better video quality. Moreover, FGS in JSVM has been designed in a way that an improvement in video quality is evenly spread out across the entire video frame, as opposed to being concentrated within only a certain spatial area of the frame, since the latter case will be visually objectionable to the end viewer.

FGS achieves graceful improvement of video quality using bit-plane coding. If a base or previous layer video frame is quantized using quantization parameter QP, then the current enhancement layer video may be quantized using a quantization parameter typically around QP-6, which effectively cuts the quantization step size in half. As a result of a lower quantization step size, more transform coefficients will become nonzero in the enhancement layer. Nonzero coefficients in the enhancement layer can be classified into three types: non-significant coefficients, significant coefficients, and refinement coefficients. Non-significant coefficients refer to those coefficients that are zero in a base or previous layer and remain zero in the current enhancement layer. Significant coefficients refer to those coefficients that are zero in the base or previous layer but become nonzero coefficients in the current enhancement layer. Refinement coefficients refer to those coefficients that are already nonzero (i.e., significant) in the base or previous layer. Their values will be refined in the current enhancement layer.

Because refinement coefficients have different statistics from other coefficients, they are coded separately in the FGS layer. Similar to H.264/AVC, there may be two entropy coding modes in SVC: Context-based Adaptive Binary Arithmetic Coding (CABAC) mode and Context-based Adaptive Variable Length Coding (CAVLC) mode. Details for an improved significant coefficient coding system in the CAVLC mode are provided that may deliver higher coding performance.

FIG. 1 is a block diagram illustrating one configuration 100 of a scalable video coding bitstream structure commonly referred to as Fine Granularity Scalability (FGS). In FGS, a video sequence is compressed into a single video stream with at least two layers: a base layer 106 and an enhancement layer 104. As illustrated, FGS may further include N−1 enhancement layers 102.

In one configuration, the base layer 106 is a nonscalable coding of the video sequence and typically has the lowest quality of the video sequence. The enhancement layer 104 and the N−1 enhancement layers 102 have varying levels of quality above that of the base layer 106. Decoding each additional enhancement layer coded after the base layer 106 results in an increased quality of the video sequence. In addition, an FGS bitstream has one significant advantage that during or after encoding, the bits pertaining to the enhancement layer 104 and the N−1 enhancement layers 102 may be truncated (reducing the bit rate and thus the decoded picture quality) in real time. This provides flexible control over the transmitted bit rate and allows the enhancement layer 104 and the N−1 enhancement layers 102 to be adjusted to match the available transmission bit rate.

Figure 2:
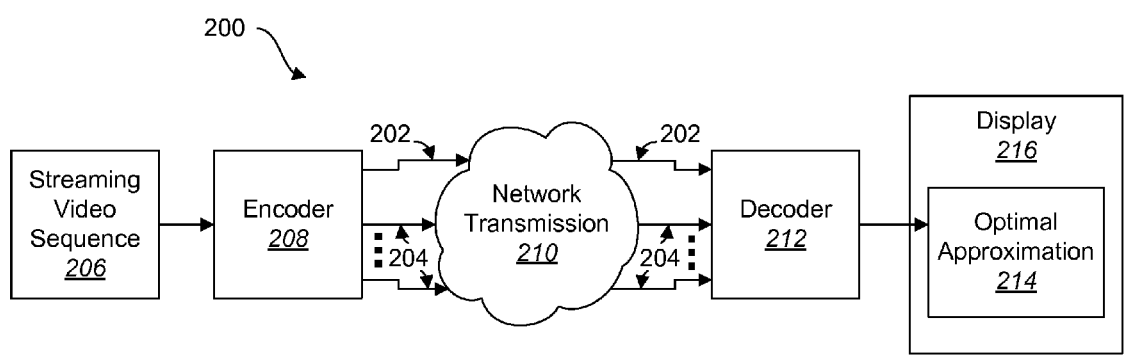
FIG. 2 is a block diagram illustrating one configuration of a base layer and a plurality of enhancement layers being sent from an encoder across a network to a decoder.

FIG. 2 is a network block diagram 200 illustrating the base layer 202 and N enhancement layers 204 being sent from an encoder 208 across a network 210 to a decoder 212. The decoder 212 may decode and use the base layer 202 and all or portions of one or more enhancement layers 204. The decoder 212 constructs an optimal approximation 214 of the original video sequence 206. In one configuration, the optimal approximation 214 is displayed on a display 216, such as a computer monitor, television, personal digital assistant (PDA), projector, etc. A video sequence 206 is encoded as a base layer 202 and one or more enhancement layers 204. The lower quality base layer 202 represents the minimum quality standard, and each of the enhancement layers 204 are improvements upon the base layer 202 picture quality.

In one configuration, the video sequence 206 is encoded using the FGS video coding format as explained in FIG. 1. The FGS coding format is particularly useful for video streaming and broadcasting applications where the available transmission bandwidth may not be known in advance. During or after encoding, the enhancement layers 204 may be truncated arbitrarily to match the available transmission bit rate. As the available bit rate changes, the enhancement layers 204 can be truncated accordingly in real time to provide optimal quality decoded video sequence with respect to the current bandwidth. For example, the network 200 may truncate the enhancement layers 204 and then send bit streams with different bit rates to different destinations.

Figure 3:
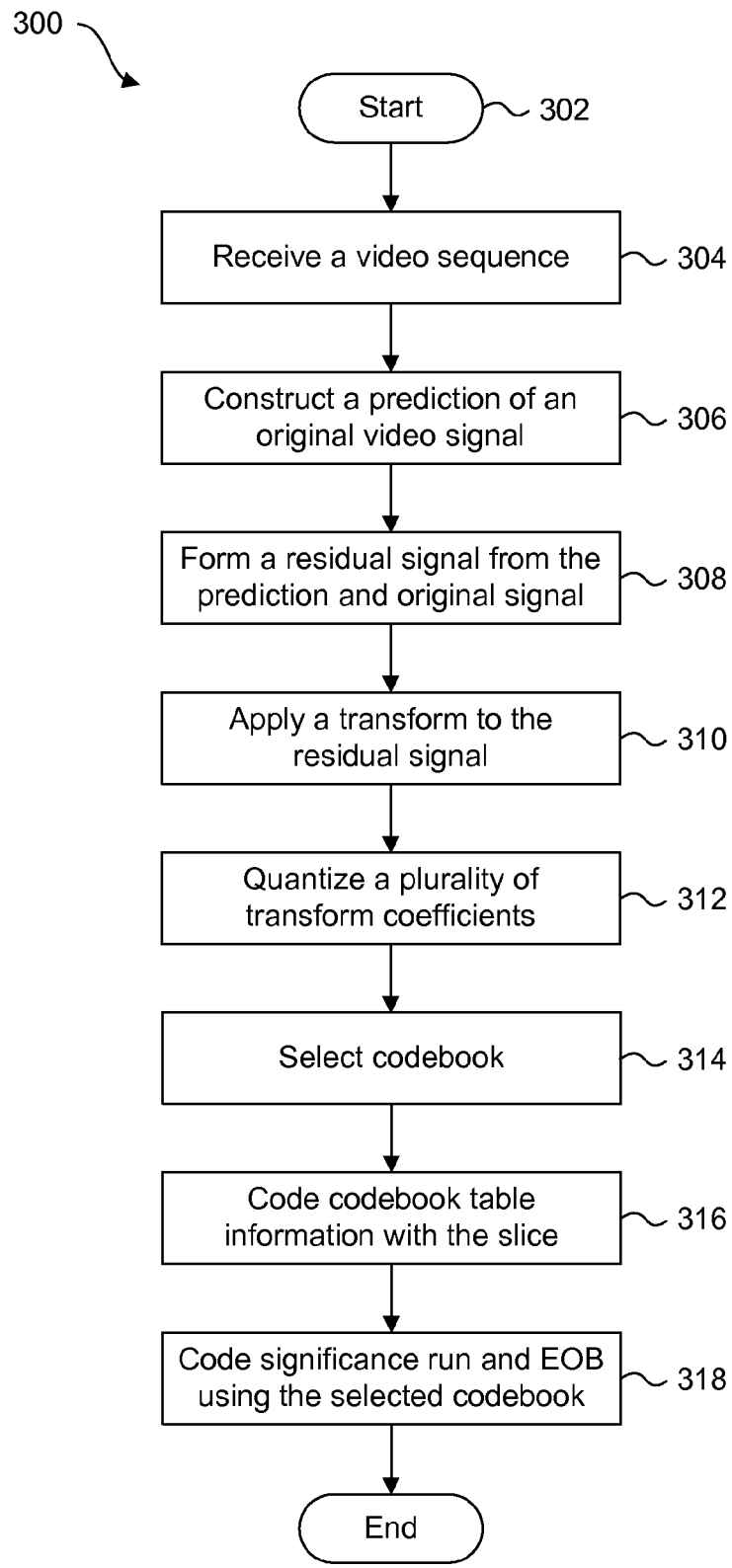
FIG. 3 is a flow chart illustrating one configuration of a method for encoding information.

FIG. 3 is a flow chart illustrating a method 300 for encoding information. In one configuration, the information to be encoded comprises a video sequence. The method 300 may be carried out within a video encoder, and the inverse of the method 300 may be executed by a video decoder. An encoder is a device used to change a signal or data into a code. The decoder may then produce the original signal or an approximation of the original signal from the code. The encoder and decoder may be collectively referred to as a video CODEC which encodes a source image or video sequence into a compressed form and decodes this to produce a copy or approximation of the source sequence.

The method 300 begins 302 with the encoder receiving 304 a video sequence. In one configuration, the video sequence is an uncompressed video signal. The encoder begins to compress the video sequence by exploiting similarities between neighboring video frames and constructing 306 a prediction of the current/original video signal. The prediction is formed from one or more previous or future frames and is improved by compensating for differences between the frames. A residual signal is then formed 308 by subtracting the prediction frame from the actual current/original frame. The encoder makes use of similarities between neighboring samples of the prediction residual to reduce spatial redundancy.

The method 300 continues by applying 310 a transform to the residual signal to reduce remaining spatial redundancy. The transform converts the prediction residual signals into another domain in which they are represented by transform coefficients. The coefficients are quantized 312 to remove insignificant values, leaving a small number of significant coefficients that provide a more compact representation of the residual samples. In one configuration, the prediction residual being encoded using the method 300 may be in an enhancement layer. If the previous layer of the video frame or the base layer of the video frame were quantized 312 using the quantization parameter QP, then the current enhancement layer is quantized 312 using a quantization parameter typically around QP-6, where QP is the quantization parameter used in the base layer. This effectively reduces the quantization step size in half. As a result of a reduced quantized step size, an increased quantity of transform coefficients will become nonzero in the current frame.

In one configuration, the nonzero quantized coefficients in the enhancement layer may be classified as non-significant, significant, and refinement coefficients.

As will be discussed herein, a VLC (variable length coding) codebook is chosen to code at least one of a significance run and EOB (end-of-block). Thus, before the significance run and EOB can be coded, a codebook is selected 314. In one configuration, the codebook is selected 314 using a codebook selection table, as will be discussed below. In one configuration, codebook table information may be coded 316 as part of the video slice. In another configuration, codebook table information may be stored at the encoder and the decoder as internal states. The codebook table information may include a codebook selection table and the table's dimension and shape. Then the significance run and EOB are coded 318 using the selected codebook.

Figure 4:
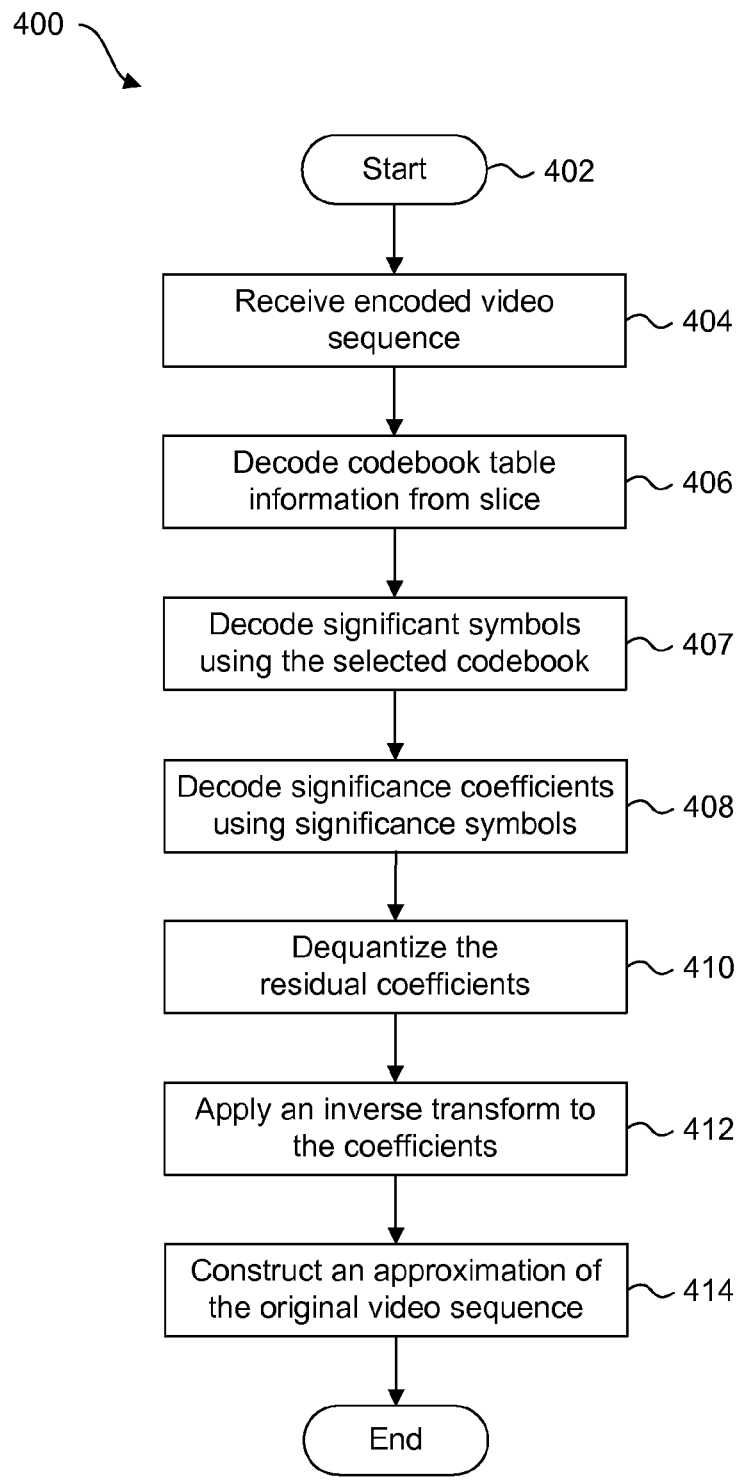
FIG. 4 is a flow chart illustrating one configuration of a method to decode an encoded video sequence.

FIG. 4 is a flow chart illustrating one configuration of a method 400 to decode an encoded video sequence. The decoding method 400 may be the inverse of the encoding method 300 of FIG. 3. The decoding method 400 begins 402 by a decoder receiving 404 the encoded video sequence. The encoded video sequence may also be referred to as the bitstream. The decoder decodes 406 the codebook table information. In one configuration, the codebook table information may include a codebook selection table that is part of the slice. The decoder decodes 407 the significant symbols using the selected codebook.

The method 400 continues and the decoder decodes 408 the significance coefficients using the recently decoded significance symbols. The decoder then proceeds to dequantize 410 the decoded significance coefficients. The method 400 proceeds by applying 412 an inverse transform to the dequantized coefficients. In one configuration, the inverse transform may include the inverse discrete cosine transform. After the decoder applies 412 the inverse transform to the coefficients, the decoder constructs 414 an approximation of the original video sequence as it existed before the encoding method 300 of FIG. 3.

Figure 5:
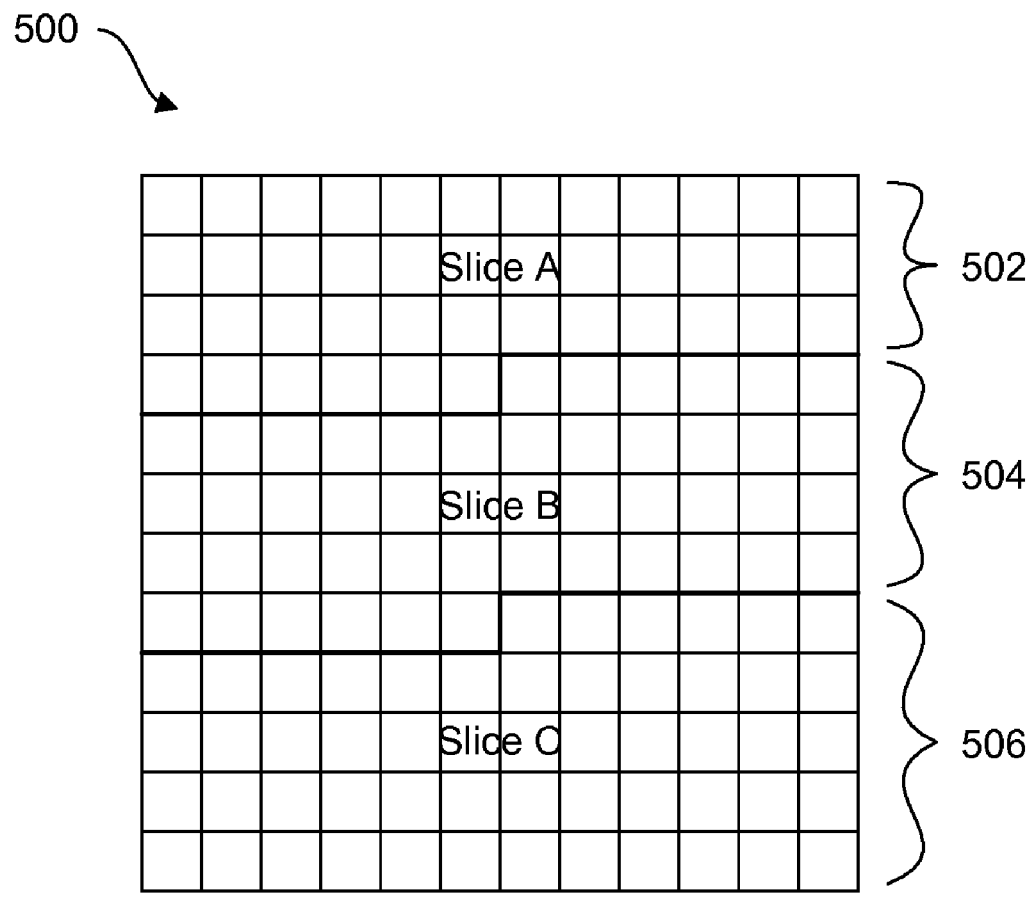
FIG. 5 illustrates one configuration of a picture frame divided into a plurality of macroblocks.

FIG. 5 illustrates one configuration of a video frame 500 divided into a plurality of macroblocks. Macroblocks are basic data units in the decoding process. As illustrated, the video frame 500 may be partitioned into a plurality of fixed-sized macroblocks that each includes a sample of the video frame 500. In one configuration, each macroblock includes a sample of 16×16 pixels. In an additional aspect, each macroblock includes a luminance (luma) component and two chrominance (chroma) components. The luma component relates to brightness of the particular sample, while the chroma components relate to color characteristics of the sample. In one configuration, the video frame 500 is further partitioned into a plurality of slices, slice A 502, slice B 504, and slice C 506. A slice is a sequence of macroblocks which are processed consecutively in a certain coding order. For example, slice A 502 and the macroblocks contained within slice A 502, may be encoded and sent to the decoder before slice B 504 and slice C 506. As an additional feature, the order of encoding the various slices 502, 504, and 506 and sending them to the decoder may be arbitrary. For example, slice B 504 may be encoded sent to the decoder before the other slices. Similarly, slice C 506 may be encoded and sent to the decoder before the other two slices. Each macroblock in the N-th enhancement layer corresponds to a macroblock in each of the N−1 enhancement layers and base layer.

Figure 6:
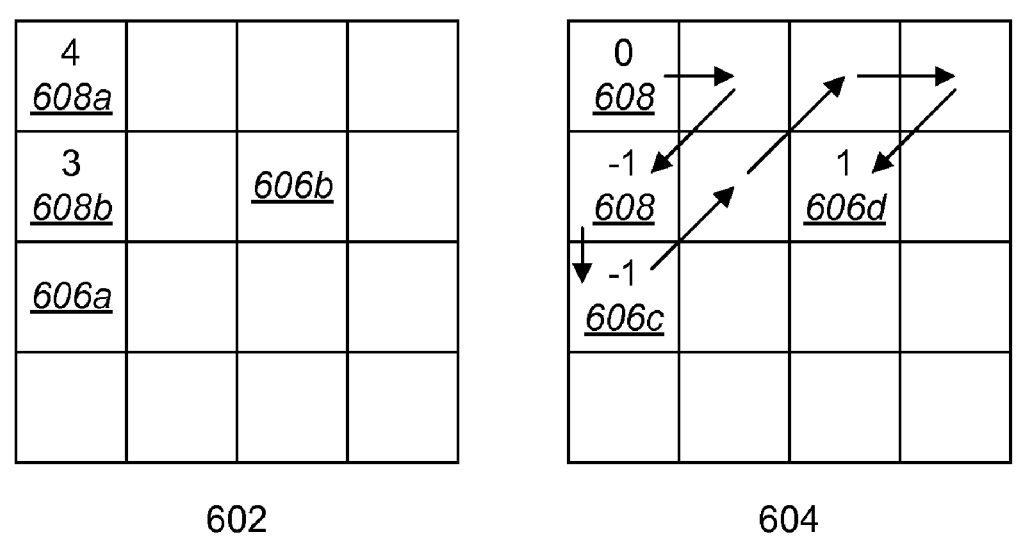

FIG. 6 illustrates an example of how to classify coefficients. A base layer coefficient block 602 and an enhancement layer coefficient block 604 are provided. The blank spaces in the base layer 602 and the enhancement layer 604 represent coefficients of zero. These coefficients are referred to as non-significant coefficients. The remaining spaces, 606, 608, 608a, and 608b each represent a coefficient that may have a nonzero value. In one configuration, the base layer coefficient block 602 is in a previous enhancement layer using the FGS video coding format. As previously explained, during the encoding method 300 of FIG. 3, transform coefficients are quantized. After quantization, the nonzero coefficients in the enhancement layer coefficient block 604 with corresponding coefficients in the base layer coefficient block 602 equal to zero are referred to as significant coefficients 606. Coefficients whose corresponding coefficients in the base layer are nonzero are referred to as refinement coefficients 608. Because significant coefficients 606 and refinement coefficients 608 have different statistics, they are coded separately in the enhancement layer 604 following the FGS coding format.

In one configuration, significant coefficients 606c, 606d are those coefficients whose corresponding coefficients 606a and 606b (the coefficient representing the same subband) in the base or previous layer are zero. Refinement coefficients 608 are those coefficients whose corresponding coefficients 608a and 608b in the base or previous layer are nonzero.

In SVC FGS layer, the significant coefficients are coded as run values. The encoder goes through the enhancement layer coefficient block 604 in zigzag scanning order until it finds a significant coefficient. The encoder then encodes the run value. Refinement coefficients encountered during the course of scanning do not contribute toward the significance run. For example, the first significant coefficient 606c in FIG. 6 is coded with run=1 instead of with run=3, without the two refinement coefficients 608 being counted. In the CAVLC mode in SVC JD5, the significance run is coded using start-step-stop or S3 code. See Thomas Wiegand, Gary Sullivan, Julien Raichel, Heiko Schwarz, and Mathias Wien, "Joint Draft 5: Scalable Video Coding", JVT-R 201, January 2006, Bangkok, Thailand. Then the sign of this coefficient is coded as 1-bit flag with 0 indicating positive value and 1 indicating negative value. The encoder then moves on to the next block until all blocks in the slice have been covered. This concludes the first significance coding cycle.

When the next significance coding cycle starts, the encoder comes back to the first block and scans for the next significant coefficient in the block. In the example of FIG. 6, run=3 will be sent for the second significant coefficient 606d. Then a bit 0 is sent to indicate this is a positive value. The encoder then moves on to the next block until all blocks in the second cycle are sent.

In the third cycle, an EOB (end-of-block) symbol is sent for the block shown in FIG. 6 to indicate that the previously coded significant coefficient is the last one in the block; no further information will be sent for this block in subsequent coding cycles. In the CAVLC mode, the EOB symbol is combined with all other run values to form a symbol set. The index of EOB in this symbol set is assigned "$I_{EOB}$." The index of a run value "R" is "$I_R$." "$I_R$" can be derived from "R" and "$I_{EOB}$" as, $I_R=R$ if $R<I_{EOB}$, otherwise, $I_R=R+1$. The index of each symbol in this symbol set may be coded using S3 code. The number of bits spent on coding a smaller index is either less than or equal to the number of bits spent on coding a larger index. Because the probability of EOB symbol has certain correlation with the coding cycle number (EOB becomes more likely in later cycles), an array specifying the offsets of EOB symbols in each cycle is encoded as part of the slice to allow the index of EOB in this symbol set, "$I_{EOB}$", to change from one coding cycle to another coding cycle. This array is constrained to be monotonically non-increasing as a function of cycle number. For example, the array {4 1 0 0 . . . } indicates that the index of EOB is coded as 4 in the first cycle, as 1 in the second cycle, and as 0 (most likely symbol) in all subsequent cycles.

The S3 code used in significance coding has a parameter: the cutoff threshold m. If a symbol s<=m, then s is coded using unary code. If a symbol s>m, then it is coded with a prefix of $$\left\lfloor \frac{s-(m+1)}{3} \right\rfloor + m + 1$$

ones ("1"s) and a suffix of "00", "01" or "10." For example, the table shown in FIG. 7 gives the S3 code words and code lengths corresponding to m=0. A context table containing 256 cutoff thresholds m for each cycle number (0, 1 . . . 15) and each location of the last encoded coefficient in the base layer (LEBL) (0, 1 . . . 15) is sent as part of the slice.

The S3 code may be best suited to code symbols whose probability distribution is biased for small symbols and becomes more flat for bigger symbols. However the actual probability distributions of significance runs are often inconsistent with this assumption. Therefore, using other VLC codes can improve coding performance.

In the systems and methods herein, one out of five types of VLC codebooks is chosen to code the significance run and EOB. The five codebooks will be referred to herein as codebook 0, codebook 1, codebook 2, codebook 3 and codebook 4. Each of these codebooks will be explained. Fewer than five codebooks may be used in some configurations. Additionally, more than five codebooks may be used in other configurations. The use of five codebooks herein is only illustrative and is not meant to be limiting.

FIG. 8 illustrates pseudo code for codebook 0. Codebook 0 uses the unary code. The unary code encodes a symbol s with (s−1) "1"s and then one "0." This codebook has code length {1, 2, 3, . . . }. It is suited for input symbols with very biased probability distribution. The pseudo code in FIG. 8 shows the encoding 802 and decoding 804 using the unary code.

Figure 9:
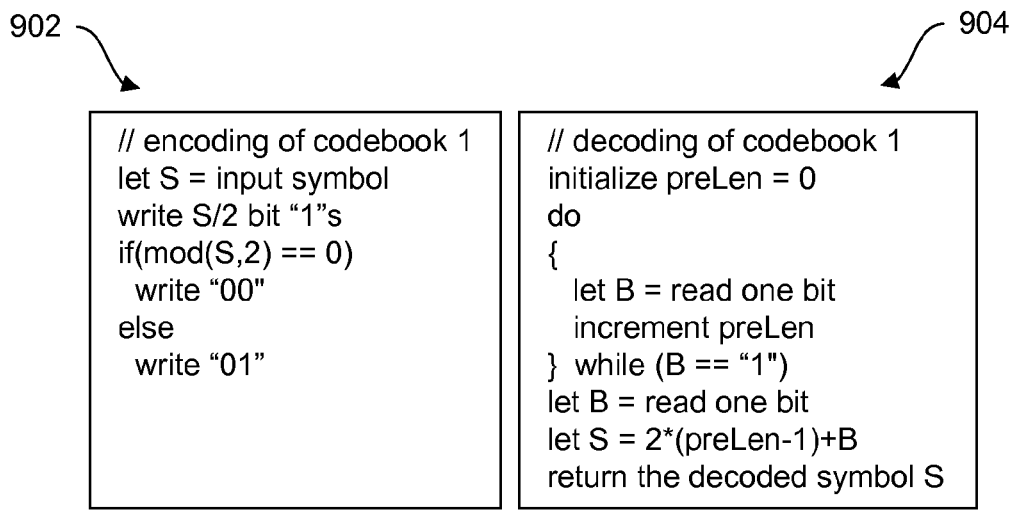
FIG. 9 illustrates pseudo code for encoding and decoding for codebook 1.

FIG. 9 illustrates pseudo code for codebook 1. Codebook 1 encodes the input symbol s with a prefix of s/2 "1"s and then a suffix of 2 bits to code the remainder mod(s,2), where mod( ) stands for the module operation. This codebook has code lengths {2, 2, 3, 3, 4, 4, . . . }. It is suited for input symbols with more even distribution compared to the unary code. The pseudo code in FIG. 9 shows the encoding 902 and decoding 904 using codebook 1.

Figure 10:
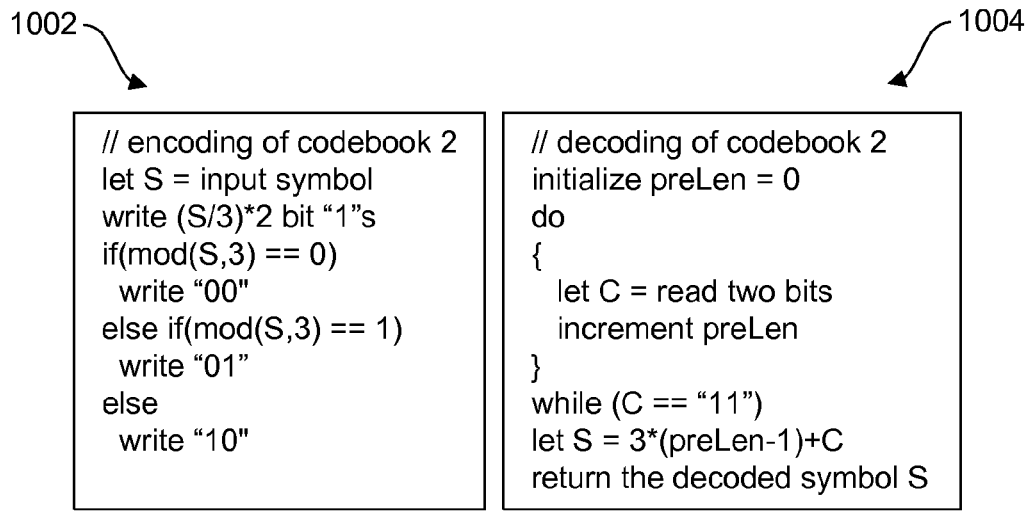
FIG. 10 illustrates pseudo code for encoding and decoding for codebook 2.

FIG. 10 illustrates pseudo code for codebook 2. Codebook 2 encodes the input symbol s with a prefix of (s/3)*2 "1"s and then a suffix of 2 bits to represent the remainder mod(s, 3). This codebook has code lengths {2, 2, 2, 4, 4, 4, 6, 6, 6 . . . } which is suited for more evenly distributed input symbols compared to codebook 1. The pseudo code in FIG. 10 shows the encoding 1002 and decoding 1004 using this codebook.

Codebook 3 uses the S3 code with m=0 (FIG. 7), with code lengths {1, 3, 3, 3, 5, 5, 5 . . . }. It is to be noted that this codebook is a shifted version of codebook 2. It encodes the input symbol s=0 with the bit 0. For all other symbols s, it uses the codebook 2 with input symbol (s+1).

Codebook 4 is a shifted version of codebook 1 (shown in FIG. 9). It encodes the input symbol s=0 with the bit 0. For all other symbols s, it uses the codebook 1 with input symbol set to (s+1).

Codebooks 0 through 4 are all structured codebooks. For certain implementation, it may not be necessary to store a look-up table at the encoder and decoder as usually required by Huffman codes.

It is worth noting again that, although a total of five codebooks are shown and discussed herein, codebooks 3 and 4 are simply shifted version of codebooks 2 and 1, respectively. This is an important feature that could be exploited to greatly simplify the decoder implementation.

The optimal codebook "c" depends on the probability distribution of the symbol set formed with significance runs and EOB symbol, which varies not only between sequences but also between frames within a given sequence.

In one configuration, a codebook selection table is explicitly coded as part of the slice. Each entry in the table is the index of the codebook used for decoding the next significance run or EOB under certain condition. The codebook selection table may contain an entry for each coding cycle number "CCN", without depending on other parameters. In a different implementation, the codebook selection table may contain an entry for each pair of coding cycle number "CCN" and the LEBL position. For coding of 4×4 blocks, both "CCN" and the LEBL position are in the range [0,15], inclusive. In either case, the encoder decides the value of each entry in the table to optimize the coding performance. In another aspect, the selection of the optimal codebook for coding the next significance run or EOB is not explicitly coded as part of the slice. The optimal codebook is selected based on the probability distribution estimated during running time and the neighboring correlation.

When there is limited bit budget for the FGS layer and the codebook selection table is explicitly coded in the slice, it is essential that the codebook selection table itself be coded efficiently to minimize bit overhead. Inefficient coding of the codebook selection table can also delay the rising slope of the rate-distortion (peak signal-to-noise ratio vs. bit rate) curve for the FGS layer. Two schemes are introduced to achieve efficient coding of the codebook selection table.

Although there is a total of five codebooks to choose from, it is observed that the "popularity" of these codebooks is different. The VLC table 1102 in FIG. 11 may be used to code the codebook entries to reduce the average bits spent on coding the table entries.

In one configuration, the selection of the optimal codebook only depends on the coding cycle number "CCN", with each coding cycle number corresponding to the index of the scan position in the zigzag scan order. The table entries are coded as follows. At first, a variable "num_sig_vlc_selectors" is coded to indicate the number of codebook selectors that are encoded in the bitstream, followed by "num_sig_vlc_selectors" codebook selectors. Each codebook selector is coded using a variable length code defined in the VLC table 1102. There is one codebook selector for each coding cycle number. The decoding process is a simple reverse of the encoding process. The codebook selectors which are not coded in the slice have the default value of 0. For example, for coding 4×4 blocks, 16 codebook selectors are needed. If "num_sig_vlc_selectors" is 5, it means the first 5 codebook selectors are explicitly coded. The remaining 11 codebook selectors are zero.

In another aspect, the codebook selection table may contain an entry for each pair of coding cycle number "CCN" and the LEBL position. The probability of codebook 0 (the unary code) being chosen generally becomes very high for large cycle number and LEBL position. Hence, it might become unnecessary to send codebooks for these contexts. In order to reduce the table dimension, the table shape and the table dimension are added as new syntax elements and sent in the slice. Hereinafter two table shapes are defined: rectangle (see FIG. 12) and triangle (see FIG. 13). Two dimensional parameters, width and height, are sent for rectangle tables; and one additional parameter, called depth, is sent for triangle table. With table shape and dimension decided, only table entries that fall within the pruned table 1202, 1302 are sent using the VLC code in FIG. 11. All other table entries 1204, 1304 (the table entries that do not fall within the pruned table) are not sent and assumed to be 0.

To obtain the table shape and dimension, the 16×16 codebook selection table is pruned in a rate-distortion optimized way. The pruning happens in the column direction first, followed by the row direction, followed by the diagonal direction (note that, however, the encoder can choose any order for pruning). Take the columns for example. Define the cost C of pruning one column of table entries as the bit penalty that will be incurred later during significance coding due to substituting codebook 0 for the optimal codebook (e.g., C is 0 if all of the entries in this column already choose codebook 0). Then define the bit savings S of pruning this column of table entries as the bits saved due to not sending these table entries per the VLC table in FIG. 11 (e.g., S=16 bits if all entries in this column choose codebook 0). If S>C, then this column of table entries is pruned. Otherwise, this column is retained, the pruning in the column direction stops, and the pruning in the row direction starts. This pruning process proves to be very effective in adapting to the target bit rate. At very low bit rates, when there are few significant coefficients, bits required to send the table entries do not justify the few bits saved by using the optimal codebook. When this is the case, the pruning process may even prune out the entire table. At higher bit rates, the pruned table tends to have bigger dimensions for the opposite reason. The complexity of this table pruning process is very low as the bit penalty of pruning every table entry can be pre-stored while forming the codebook selection table. The pseudo-code 1402 in FIG. 14 summarizes how to send the pruned table.

Figure 15:
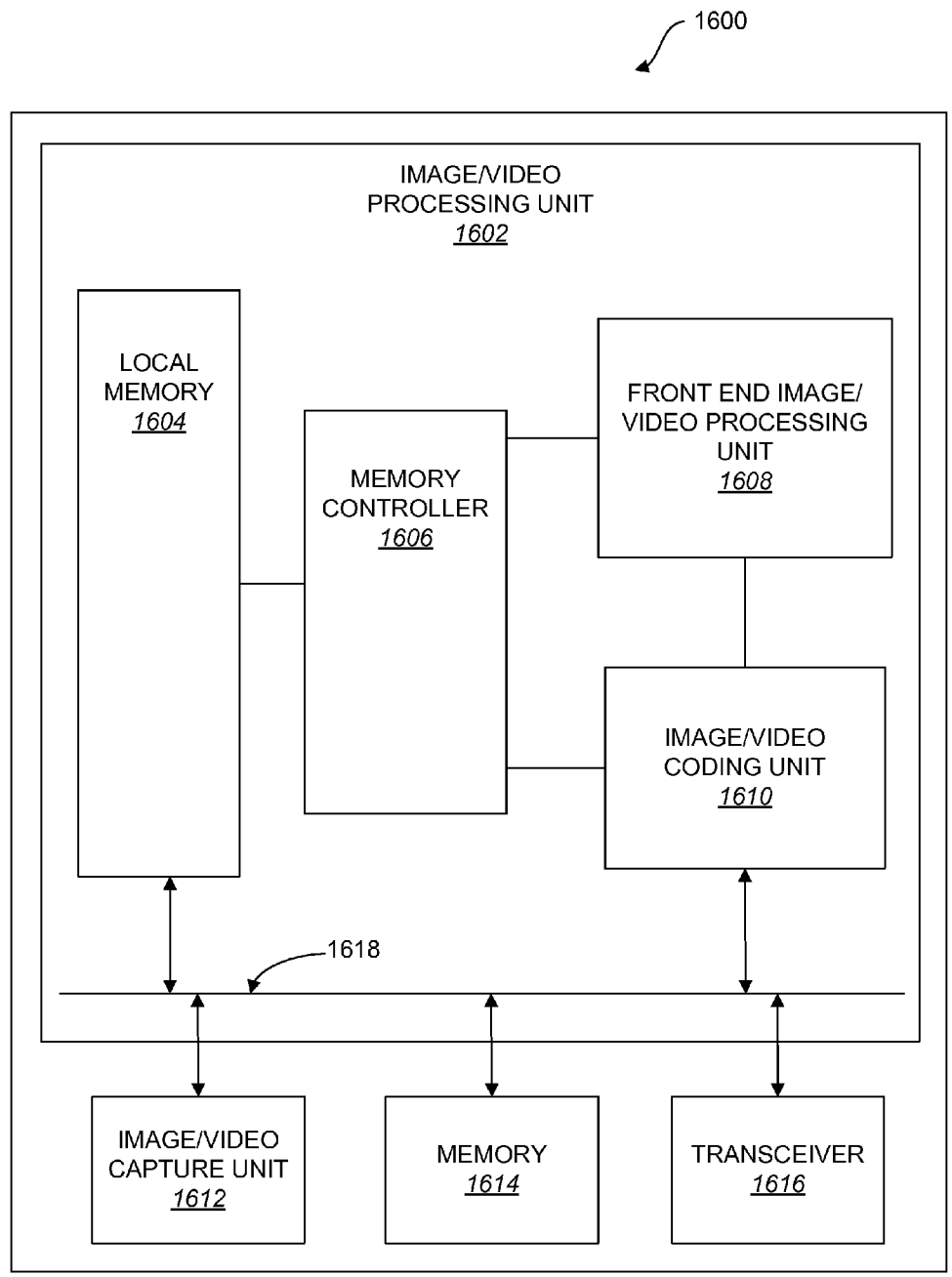
FIG. 15 is a block diagram illustrating the major hardware components typically utilized to process digital images and/or digital video.

FIG. 15 illustrates a device 1600 configured to process digital images and/or digital video. The device 1600 may represent or be implemented in a digital television, a digital direct broadcast system, a wireless communication device, a PDA, a laptop computer, a desktop computer, a digital camera, a digital recording device, a network-enabled digital television, a cellular or satellite radio telephone, or any telecommunication device with video telephony (VT) capabilities.

The device 1600 may process, encode, decode, transmit and/or receive image and/or video data. The video data may be captured by a video camera, such as a video capture unit (or image sensor) 1612, retrieved from a video archive, or obtained in another manner. A video coding unit 1610 in the device 1600 may use a video coding standard such as MPEG-4, ITU-T H.263, ITU-T H.264, or any other video coding standard. The video coding unit 1610 may support inter-frame coding techniques, such as motion estimation and motion compensation, and intra-frame coding techniques, such as spatial estimation and intra-prediction coding techniques.

The device 1600 may include an image/video capture device 1612, such as a camera or video camera, to capture images or video sequences and store the captured images or sequences in a memory 1614. An image/video processing unit 1602 may process images and/or video sequences. The memory 1604 may store the images and/or video sequences before and after such processing.

A transceiver 1616 may receive and/or transmit coded video sequences to another device. The transceiver 1616 may use a wireless communication standard such as code division multiple access (CDMA). Examples of CDMA standards include CDMA 1xEV-DO, Wideband Code Division Multiple Access (WCDMA), etc.

One or more elements of the device 1600 may be communicatively coupled via a communication bus 1618. In addition to or instead of the elements shown in FIG. 16, other elements may be included in the device 1600. The architecture illustrated in FIG. 16 is merely an example. The techniques described herein may be implemented with a variety of other architectures.

The memory 1614 may have a relatively large memory space. The memory 1614 may comprise dynamic random access memory (DRAM), or FLASH memory. The memory 1614 may comprise "NOR" or "NAND" gate memory technology, or any other data storage technology. In other examples, the memory 1614 may comprise a non-volatile memory or any other type of data storage unit.

The image/video processing unit 1602 may comprise a chip set for a mobile radiotelephone, which may include hardware, software, firmware, and/or one or more microprocessors, digital signal processors (DSPs), application specific integrated circuits (ASICs), field programmable gate arrays (FPGAs), or various combinations thereof. The processing unit 1602 may include a local memory 1604 coupled to a front-end image/video processing unit 1608 and an image/video coding unit 1610. The coding unit 1610 may comprise an encoder/decoder (CODEC) for encoding (or compressing) and decoding (or decompressing) digital video data.

The local memory 1604 may comprise a smaller and faster memory space relative to the memory 1614. For example, the local memory 1604 may comprise synchronous dynamic random access memory (SDRAM). The local memory 1604 may comprise "on-chip" memory integrated with the other components of the processing unit 1602 to provide fast access to data during a processor-intensive coding process. However, the memories 1614 and 1604 may be combined into one memory, or may be implemented in a number of other configurations. A memory controller 1606 may control memory fetches and write-backs to the local memory 1604.

The front-end image/video processing unit 1608 may perform one or more image processing techniques on the frames of a video sequence to improve image quality, and thereby improve the quality of a video sequence. For example, the front-end image/video processing unit 1608 may perform techniques such as demosaicing, lens rolloff correction, scaling, color correction, color conversion, and spatial filtering. The front-end image/video processing unit 1608 may also perform other techniques. In general, the techniques performed by the unit 1608 are referred to as "front-end" image processing techniques because the techniques precede coding by the image/video coding unit 1610.

The image/video capture unit 1612 may comprise image sensors that include color filter arrays (CFAs) arranged on a surface of the sensors. Front-end image processing performed by the unit 1608 may improve the quality of the video sequence captured by the capture unit 1612. For example, the front-end processing unit 1608 and/or the coding unit 1610 may comprise a DSP programmed to process images captured by the capture unit 1612. The same area of memory 1604 (or memory 1614) may used for both front-end image processing purposes and for other storage purposes.

The image/video coding unit 1610 may perform image and/or video coding, which may include one or more video compression techniques, such as inter-frame compression and/or intra-frame compression. For example, the coding unit 1610 may implement motion estimation and motion compensation techniques to exploit temporal or inter-frame data correlation to provide inter-frame compression. Alternatively or additionally, the coding unit 1610 may perform spatial estimation and intra-prediction techniques to exploit spatial or intra-frame data correlation to provide intra-frame compression. The output of motion compensation (or intra-prediction)

is referred to as "residual," and may comprise a block of data indicative of differences between a current video block to be coded and a prediction block identified by motion estimation or spatial estimation.

After the coding unit 1610 performs motion compensation (or intra-prediction) to create the residual, a series of additional steps may be performed to further code the residual and further compress the data. The additional steps may depend on the coding standard being used, but are generally referred to as "residual coding." The coding unit 1610 may perform one or more of these video compression techniques to reduce the amount of data needed to communicate a video sequence to another device via the transceiver 1616.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

The various illustrative logical blocks, modules, and circuits described in connection with the configurations disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the configurations disclosed herein may be embodied directly in hardware, in a software module executed by a processor, or in a combination of the two. A software module may reside in random access memory (RAM), flash memory, read-only memory (ROM), erasable programmable read-only memory (EPROM), electrically erasable programmable read-only memory (EEPROM), registers, hard disk, a removable disk, a compact disc read-only memory (CD-ROM), or any other form of storage medium known in the art. A storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present systems and methods. In other words, unless a specific order of steps or actions is required for proper operation of the configuration, the order and/or use of specific steps and/or actions may be modified without departing from the scope of the present systems and methods.

While specific configurations and applications of the present systems and methods have been illustrated and described, it is to be understood that the present systems and methods are not limited to the precise configuration and components disclosed herein. Various modifications, changes, and variations which will be apparent to those skilled in the art may be made in the arrangement, operation, and details of the methods and systems disclosed herein without departing from the spirit and scope of the systems and methods.

What is claimed is:

1. A method of coding significance coefficients in a video sequence comprising:
   receiving a video sequence in an electronic video coder;
   constructing a prediction of an original video signal in a current frame from the video sequence;
   forming a residual signal by subtracting the prediction of the original video signal from the original video signal in the current frame;
   applying a transform to the residual signal;
   quantizing a plurality of transform coefficients;
   selecting a codebook from a plurality of codebooks to code at least one of a significance run and an end-of-block;
   coding, using the selected codebook by the video coder, the at least one of the significance run or the end-of-block to generate a portion of an encoded video bitstream; and
   outputting the generated portion of the encoded video bitstream from the electronic video coder.

2. The method of claim 1, wherein coding the at least one of the significance run or end-of-block further comprises coding the significance run and the end-of-block using the selected codebook.

3. The method of claim 1, further comprising coding codebook table information with a video slice.

4. The method of claim 3, wherein the codebook table information comprises a codebook selection table.

5. The method of claim 3, wherein the codebook table information comprises a codebook selection table with each entry corresponding to each pair of coding cycle numbers and a LEBL (last encoded coefficient in the base layer) position.

6. The method of claim 3, wherein the codebook table information comprises a codebook selection table with each entry corresponding to only the coding cycle number.

7. The method of claim 6, further comprising coding the codebook selection table as a one-dimensional codebook selection array.

8. The method of claim 7, further comprising coding a variable that specifies a number of the codebook selection table entries that are explicitly coded, wherein the variable is followed by codebook selectors, wherein each codebook selector is coded using a variable length code.

9. The method of claim 3, wherein the codebook table information comprises a table shape and a table dimension.

10. The method of claim 9, wherein the table shape is rectangular.

11. The method of claim 9, wherein the table shape is triangular.

12. The method of claim 1, wherein a codebook selection table is dynamically determined from a statistics estimation.

13. The method of claim 1, wherein a codebook selection table is dynamically determined from a neighboring correlation.

14. The method of claim 1, wherein among the plurality of codebooks, one codebook is a shifted version of another codebook.

15. The method of claim 1, further comprising:
pruning a codebook selection table to provide a pruned codebook selection table; and
coding the pruned codebook selection table with a video slice.

16. A method of decoding significance coefficients in an encoded video sequence comprising:
receiving an encoded video bitstream in an electronic video decoder;
retrieving codebook table information from the bitstream;
decoding significance symbols using the retrieved codebook table information;
decoding significance coefficients using the significance symbols;
dequantizing a plurality of transform coefficients;
applying an inverse transform to a residual signal;
constructing a video sequence in the video decoder; and
outputting the constructed video sequence from the electronic video decoder.

17. The method of claim 16, further comprising decoding codebook table information from a slice.

18. The method of claim 17, wherein the codebook table information comprises a codebook selection table.

19. The method of claim 18, wherein the codebook table information comprises a codebook selection table mapping cycle number and a LEBL (last encoded coefficient in the base layer) position.

20. The method of claim 19, wherein the codebook table information comprises a codebook selection table mapping cycle number.

21. The method of claim 19, wherein the codebook table information comprises a table shape and a table dimension and wherein the table shape is rectangular or triangular.

22. The method of claim 16, wherein a codebook selection table is dynamically determined from at least one of a statistics estimation and a neighboring correlation.

23. An electronic device that is configured to code significance coefficients in a video sequence, the electronic device comprising:
a non-transitory computer readable medium having stored thereon executable instructions;
means for electronically receiving a video sequence; and
means for processing the electronically received video sequence in response to executing the instructions stored on the non-transitory computer readable medium to:
construct a prediction of an original video sequence in a current frame from the video sequence;
form a residual frame by subtracting the prediction of the original video signal from the original video signal in the current frame;
apply a transform to the residual signal;
quantize a plurality of transform coefficients;
select a codebook from a plurality of codebooks to code at least one of a significance run and end-of-block; and
code the at least one of the significance run or the end of block using the selected codebook.

24. An electronic device that is configured to code significance coefficients in a video sequence, the electronic device comprising:
a memory configured to store at least part of an video sequence; and
a video processor configured to:
construct a prediction of an original video sequence in a current frame from the video sequence;
form a residual frame by subtracting the prediction of the original video signal from the original video signal in the current frame;
apply a transform to the residual signal;
quantize a plurality of transform coefficients;
select a codebook from a plurality of codebooks to code at least one of a significance run and end-of-block; and
code the at least one of the significance run or the end of block using the selected codebook.

25. An apparatus for decoding significance coefficients in an encoded video sequence comprising:
a memory configured to store at least part of an encoded video bitstream; and
a video processor configured to:
retrieve codebook table information from the bitstream;
decode significance symbols using the retrieved codebook table information;
decode significance coefficients using the significance symbols;
dequantize a plurality of transform coefficients;
apply an inverse transform to a residual signal; construct a video sequence in the video decoder.

26. A non-transitory computer-readable medium having stored thereon instruction that when executed by a processor cause the processor to:
retrieve codebook table information from the bitstream;
decode significance symbols using the retrieved codebook table information;
decode significance coefficients using the significance symbols;
dequantize a plurality of transform coefficients;
apply an inverse transform to a residual signal; construct a video sequence in the video decoder.

27. A method of coding significance coefficients in a video sequence comprising:
receiving a video sequence in an electronic video coder;
constructing a prediction of an original video signal in a current frame from the video sequence;
forming a residual signal by subtracting the prediction of the original video signal from the original video signal in the current frame;
applying a transform to the residual signal;
quantizing a plurality of transform coefficients associated with the transform;
selecting a codebook from a plurality of codebooks to code a significance run associated with the coefficients;
coding, using the selected codebook by the video coder, the significance run to generate a portion of an encoded video bitstream; and
outputting the generated portion of the encoded video bitstream from the electronic video coder.

28. The method of claim 27, further comprising coding an end-of-block using the selected codebook to further generate a portion of the encoded video bitstream.

29. The method of claim 27, wherein the codebook table information comprises a pruned table having a table shape and a table dimension.

30. The method of claim 29, wherein the table shape is rectangular.

31. The method of claim 29, wherein the table shape is triangular.

32. The method of claim 27, further comprising coding the selected codebook using a variable length code (VLC).

* * * * *